(12) United States Patent
Dehu et al.

(10) Patent No.: US 8,151,550 B2
(45) Date of Patent: Apr. 10, 2012

(54) CONTROL METHOD FOR ACTUATING A THRUST REVERSER

(75) Inventors: Michel Philippe Dehu, Tournefeuille (FR); Fabrice Henri Emile Metezeau, Montivilliers (FR)

(73) Assignee: Aircelle (FR)

( * ) Notice: Subject to any disclaimer, the term of this patent is extended or adjusted under 35 U.S.C. 154(b) by 885 days.

(21) Appl. No.: 12/094,425

(22) PCT Filed: Nov. 21, 2005

(86) PCT No.: PCT/FR2005/002883
§ 371 (c)(1),
(2), (4) Date: May 21, 2008

(87) PCT Pub. No.: WO2007/057524
PCT Pub. Date: May 24, 2007

(65) Prior Publication Data
US 2008/0289317 A1 Nov. 27, 2008

(51) Int. Cl.
*F02K 1/32* (2006.01)
(52) U.S. Cl. .................... 60/226.2; 244/110 B
(58) Field of Classification Search ............ 60/204, 60/226.2, 230; 244/110 B
See application file for complete search history.

(56) References Cited

U.S. PATENT DOCUMENTS

| | | | | |
|---|---|---|---|---|
| 5,167,119 A | * | 12/1992 | Ward | 60/226.2 |
| 5,960,626 A | * | 10/1999 | Baudu et al. | 60/226.2 |
| 6,519,929 B2 | * | 2/2003 | Ahrendt | 60/226.2 |
| 6,771,032 B2 | * | 8/2004 | Cox-Smith et al. | 60/226.2 |
| 2003/0019206 A1 | | 1/2003 | Johnson | |

FOREIGN PATENT DOCUMENTS

| | | |
|---|---|---|
| EP | 0466316 | 1/1992 |
| EP | 0843089 | 5/1998 |
| EP | 1280029 | 1/2003 |

OTHER PUBLICATIONS

International Search Report PCT/FR2005/002883 Dated Nov. 15, 2006.

* cited by examiner

*Primary Examiner* — Ehud Gartenberg
*Assistant Examiner* — Vikansha Dwivedi
(74) *Attorney, Agent, or Firm* — Cantor Colburn LLP

(57) ABSTRACT

The invention relates to a control method for opening or closing a turbojet engine thrust reverser (1) by using at least one mobile cowl (2) displaceable by means of at least one electric motor (7) consisting in analyzing at least one parameter representative for a pressure in the turbojet engine jet and in carrying out an operating sequence in which the operating parameters of the electric motor (7) are adjusted to a situation.

16 Claims, 5 Drawing Sheets

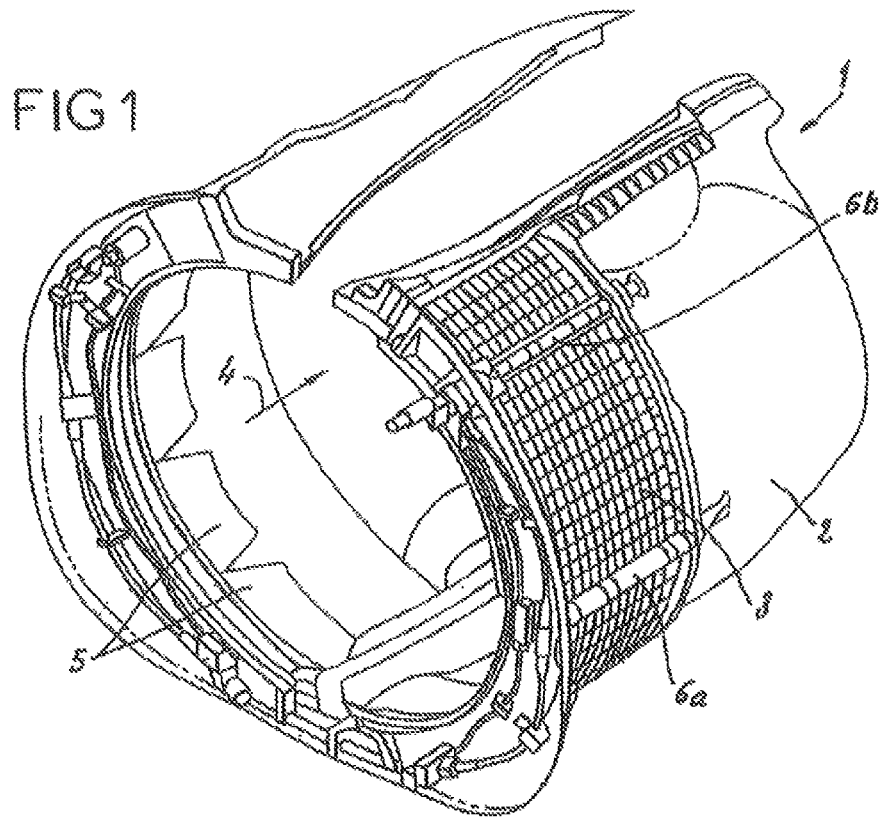
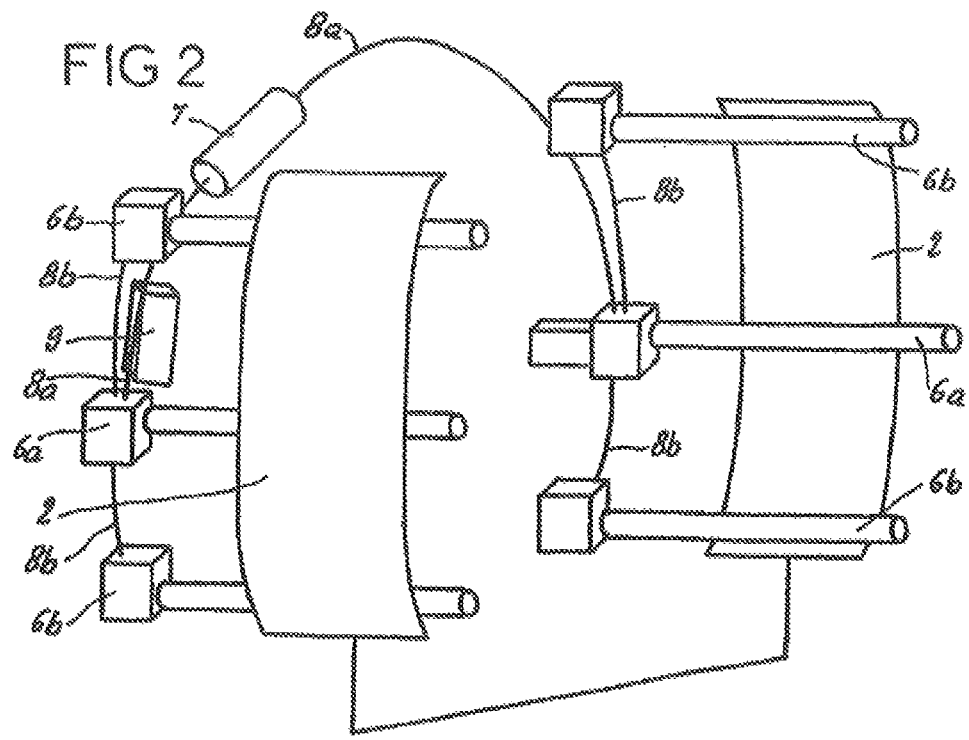

CONTROL METHOD FOR ACTUATING A THRUST REVERSER

FIELD OF THE INVENTION

The present invention relates to a method for controlling a turbojet thrust reverser, employing at least one moving cover that can be moved by means of at least one electric motor. The invention also relates to a thrust reverser suited to such a control method.

BACKGROUND OF THE INVENTION

The purpose of a thrust reverser when an airplane lands is to improve the ability of an airplane to brake by redirecting forward at least some of the thrust generated by the turbojet. In this phase, the reverser obstructs the jet pipe and directs the jet ejected from the engine toward the front of the nacelle, thereby generating a reverse thrust which adds to the braking of the wheels of the airplane.

The means employed to redirect the jet in this way vary according to the type of reverser. However, in all cases, the structure of a reverser comprises moving covers which can be moved between, on the one hand, a deployed position in which they open up within the nacelle a passage intended for the diverted jet and, on the other hand, a retracted position in which they close off this passage. These moving covers can also perform a deflecting function or may simply activate other deflecting means.

In cascade-type thrust reversers, for example, the moving covers slide along rails so that on retreating during the opening phase, they uncover the cascades of deflector vanes positioned within the thickness of the nacelle. A system of link rods connects this moving cover to locking doors which deploy into the jet pipe duct and block off the direct jet outlet. In door-type thrust reversers by contrast, each moving cover pivots in such a way as to block off the jet and deflect it and is therefore active in this redirection.

In general, the moving covers are actuated by hydraulic or pneumatic actuators which require a pressurized-fluid transport network. This pressurized fluid is conventionally obtained either by bleeding air off the turbojet in the case of a pneumatic system or by tapping off the airplane hydraulic circuit. Such systems require a great deal of maintenance because the slightest leak in the hydraulic or pneumatic network may be difficult to detect and carries the risk of having serious consequences both for the reverser and for other parts of the nacelle. Furthermore, because of the lack of space available in the front section of the reverser, fitting and protecting such a circuit are particularly tricky and space-consuming operations.

Another disadvantage with the hydraulic and pneumatic systems is that the actuators or the motor always deliver the maximum power for which they were designed and which has to correspond to the power needed to open or close the reverser under heavily loaded landing or takeoff situations. More specifically, these are, in particular, opening (or deployment) in the event of an aborted takeoff, and closure (or retraction) in the event of an aborted landing, which scenarios require a great deal more motive power than is required under normal circumstances to overcome the stresses associated with a very high turbojet speed. The issue in particular is one of being able to provide enough power that, on the one hand, during opening, the strong depression created by the direct jet which opposes the onset of opening of the moving cover and detachment of its closure seal can be overcome and, on the other hand, upon closing, the higher opposing aerodynamic forces can be overcome. Although rare, these operating scenarios have of course to be taken into consideration for safety reasons.

Because the power delivered by the actuators is always the maximum power needed to ensure that the reverser works in these heavily laden scenarios, the loads exerted on the structures and the equipments are always the highest loads, therefore leading to premature fatigue wear of the various components of the reverser. Furthermore, should a component of the reverser become jammed, the dynamic and static loads will also be very high.

For example, if the latches that latch the reverser closed become jammed, the dynamic loadings due to a shock of the moving cover in motion will be very great. The latch has to be designed to be able to withstand this shock with a motor (or a system) acting at full speed and full power. It will therefore be necessary for this latch to be overengineered to the detriment of the overall mass. This same line of arguing may apply to other components of the reverser.

More specifically, with a pneumatic or hydraulic system, the probability of a shock occurring at full power is equal to the probability of the reverser becoming jammed because full power is delivered each time it is used. According to manufacturer standards, reverser jamming is therefore an extreme case the probability of occurrence of which is too high to be able to tolerate plastic deformation of the components. The solution adopted to avoid such deformations is for the components of the thrust reverser to be overengineered at the expense of the overall mass.

It should be noted here that the mass of the equipments is an essential aspect in aeronautical design and that the thrust reverser constitutes the heaviest nacelle subassembly. It is therefore advantageous to seek to reduce this mass as far as possible while at the same time meeting safety and strength standards.

In order to offset the disadvantages associated with the pneumatic and hydraulic systems, thrust reverser manufacturers have sought to replace them and to equip their reversers as far as possible with electromechanical actuators which are lighter in weight and more reliable. A reverser such as this is described in document EP 0 843 089. However, the issue of the forces exerted on the structure has not been entirely resolved because it is still necessary for the electric motors to be capable of operating the reverser under the heavily laden scenarios.

SUMMARY

It is an object of the present invention to overcome the aforementioned disadvantages and, in particular, to optimize the mass saving permitted by the use of electromechanical actuators and to improve the longevity of the thrust reverser and for that reason the invention includes a control method for opening or closing a turbojet thrust reverser employing at least one moving cover that can be moved by means of at least one electric motor, characterized in that it comprises, for the opening and/or closing phase, the following steps aimed at:
- analyzing at least one parameter representative of the pressure in the turbojet stream,
- executing an operating sequence in which the operating parameters of the electric motor are suited to the situation.

Thus, when the thrust reverser has to be actuated in a scenario in which substantial forces need to be provided, that is to say in the event of an aborted takeoff or of an aborted landing for example, analysis of a parameter representative of the pressure in the turbojet stream, indicative of the operating speed and of the forces to be supplied in order to open or close the reverser, makes it possible to detect that one of these situations has arisen and adapt the parameters of said reverser opening or closing sequence accordingly. As a subsidiary effect, analyzing the representative parameter therefore makes it possible not to execute the operating sequence needlessly with electric motor operating parameters that are not needed in the event of normal actuation. In so doing, the operating parameters intended for scenarios involving heavy loadings are no longer applied as a matter of routine but are reserved merely for heavily laden scenarios. The probability of a shock occurring at high engine power is, by virtue of the method according to the invention, considerably reduced because this event can arise only when this high power is required given the representative parameter. The occurrence of a shock at full power is therefore no longer an extreme case because the probability of the reverser becoming jammed is, by virtue of the method according to the invention, multiplied by the probability of the reverser operating in a highly laden situation, and is therefore greatly reduced. According to manufacturer standards, this is an extreme case which allows a certain plastic deformation of the components, making it possible to scale down certain components.

As a preference, the representative parameter analyzed is obtained from the speed of the turbojet low pressure compressor shaft. The representative parameter may, depending on the type of turbojet, directly be the rotational speed of the shaft itself, or a reduced speed thereof if a reduction gearbox is positioned between the compressor shaft and a fan. Specifically, only the rotational speed actually transmitted to the fan is a parameter representative of the pressure in the turbojet stream. This value can readily be obtained via the electronic system that controls the turbojet and known by its English-language acronym FADEC which stands for Full Authority Digital Engine Control. Of course, other values may be used such as, for example, the air pressure in the turbojet. It is also possible to analyze several representative parameters such as, for example, the reduced rotational speed of the low-pressure shaft corrected by the ambient temperature and ambient pressure values, so as to obtain a more refined and more reliable analysis.

Advantageously, the sequence executed is chosen from at least two predetermined sequences that correspond to instances in which the turbojet is at low speed and at high speed, respectively. A low turbojet speed means the turbojet operating speeds during normal deployment or retraction of the reverser, and instances in which the reverser is maneuvered during maintenance operations, with the turbojet then not operating. This speed generally corresponds to low pressure compressor shaft rotational speeds of below about 30 to 40% of the maximum speed set by the manufacturer of the turbojet. This value is not an absolute reference and may be altered according to the characteristics of the turbojet and according to the actual loadings exerted on the moving covers as they move. Conversely, low pressure compressor shaft rotational speeds in excess of about 30 to 40% of the maximum speed correspond to a high speed. It should also be noted that this dividing value separating high and low speeds is not necessarily the same for opening phases as it is for closing phases.

Indeed, as explained earlier, upon opening, the issue will essentially be one of supplying the power needed to detach the moving cover, whereas upon closure, the issue will be rather one of overcoming the external air stream that opposes closure of the moving cover. The progressions of these two constraints as the turbojet speed changes are not the same and it will therefore be advantageous to provide different low speed/high speed dividing values for opening by comparison with closure.

Advantageously, when the operating sequence is being executed, the electric motor delivers a torque less than or equal to a maximum limit value. Thus, the torque delivered by the electric motor to actuate the moving covers is calibrated and can be limited to the torque that is just enough to move the moving covers under the turbojet speed conditions. Unlike the pneumatic or hydraulic systems already described, the power of an electric motor depends on the current supplied to this motor and can be regulated so that the motor delivers its maximum power only if needed. By limiting the application of a high torque to instances where the loading is high, the probability that the reverser will have to withstand high static loadings in the event of jamming will be greatly reduced because it is multiplied by the probability of it being in a scenario in which there are high loads. Wear and fatigue of reverser components are therefore reduced and, accordingly, the strength and longevity of the reverser are thereby improved.

As a preference, when the value of the parameter representative of the turbojet speed lies within a predetermined range, the maximum limit value on the torque delivered by the electric motor is determined by applying a function similar to the value of the representative parameter. In this way, it is possible to provide at least one operating sequence which will be executed for intermediate turbojet operating speeds. This makes it possible to fine-tune the parameters of the opening sequence.

More advantageously still, the operating sequence executed for a turbojet operating at low speed comprises a test step for testing the operating status (rotating) of the electric motor which, in the event that the latter is not operating (not rotating), will cause the operating sequence intended for a turbojet operating at a higher speed to be applied. A step such as this is particularly useful if analysis of the parameter representative of the turbojet speed is impossible or is erroneous and the sequence executed is the one intended for a turbojet operating at low speed. In this case, if this sequence proves unsuitable, the sequence intended for heavily laden scenarios will be executed.

Advantageously also, the speed of the motor is limited at least at the start of the operating sequence executed. By limiting the speed, the dynamic loadings and the inertial effects liable to be exerted on the reverser structure in the event of its being jammed are limited. Once the sensitive components such as the latches have been negotiated, it is possible to set a higher second speed datum value.

As a preference, the operating sequence applied comprises at least one step of checking and regulating the speed.

As a preference also, the operating sequence comprises a control loop for checking the operating status of the electric motor and capable of shutting this electric motor down. Thus, if any jamming is detected, the electric motor can be stopped or kept on standby.

Advantageously, provision is made for an operating sequence to be initiated by default if the representative parameter cannot be analyzed. This default sequence may be a sequence identical to one of the proposed operating sequences or may be a special sequence.

The present invention also consists of a thrust reverser comprising at least one moving cover that can be moved under the action of at least one electric motor, characterized in that the electric motor is controlled via at least one control interface capable, in succession, of analyzing at least one parameter representative of the turbojet speed and of delivering at least one suitable operating datum value.

As a preference, the control interface is connected to a turbojet control unit delivering the representative parameter.

Advantageously, the electric motor is a self-controlled synchronous motor. An electric motor such as this is particularly well suited to torque and/or speed control. In addition, the rotational speed and the torque delivered can readily be measured.

Advantageously also, the electric motor is torque controlled at constant speed. As a preference, the interface comprises regulating means for regulating the torque delivered by the electric motor.

Advantageously, the control interface is capable of receiving a speed datum value and of converting it into a torque instruction that it delivers to the electric motor. As a preference, the control interface comprises regulating means for regulating the speed of the electric motor.

BRIEF DESCRIPTION OF THE FIGURES

Implementation of the invention will be better understood through the detailed description which is explained hereinafter with reference to the attached drawing in which:

FIG. 1 is a partial perspective schematic view of a nacelle incorporating a cascade-type thrust reverser.

FIG. 2 is a schematic depiction of the moving covers and of their actuating system.

DETAILED DESCRIPTION

Figure 3:
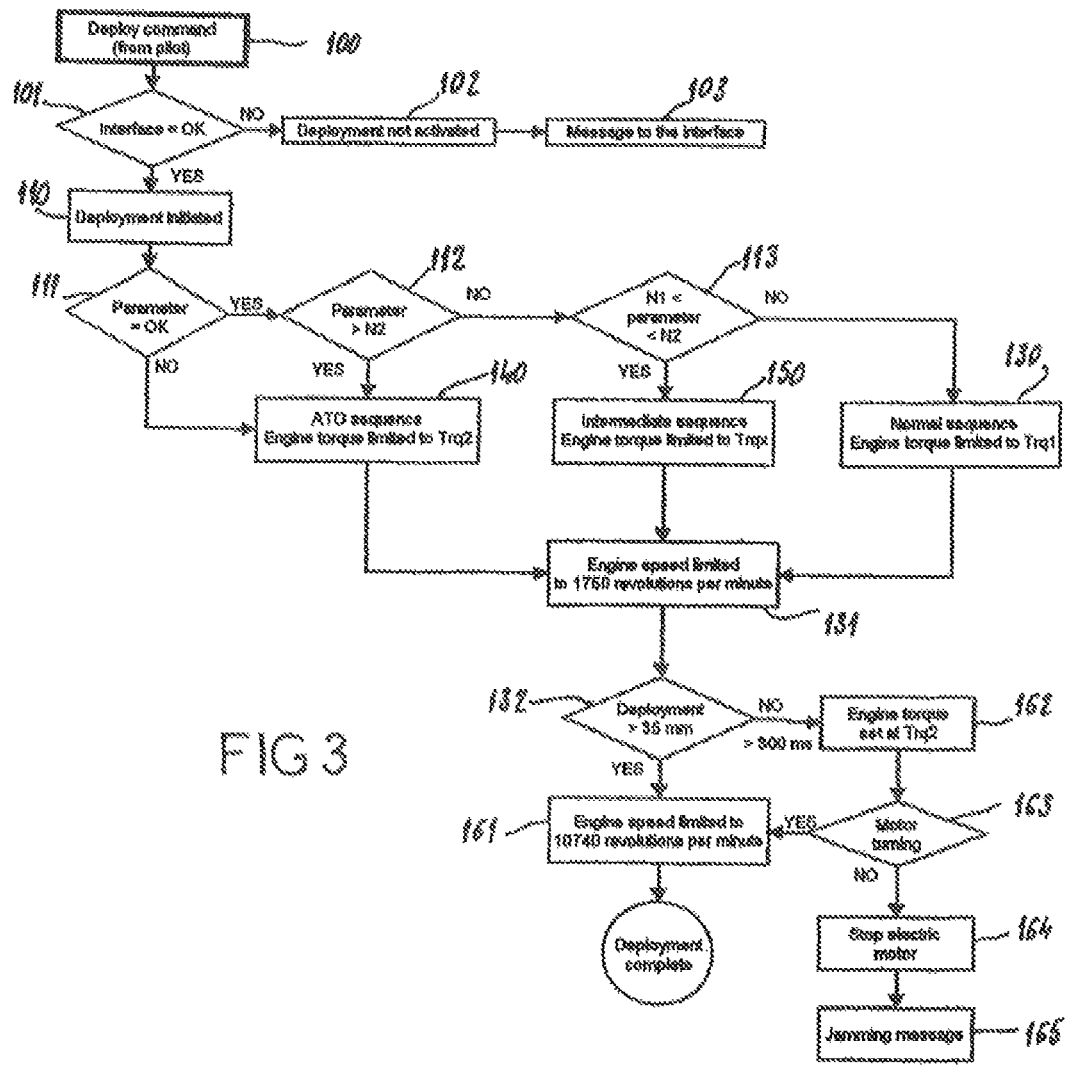
FIG. 3 is a diagram representing the steps of operation of a control method according to the invention for opening a thrust reverser.

Before describing an embodiment of the invention in detail, it is important to emphasize that the invention is not restricted to any particular type of reverser. Although it has been illustrated using a cascade-type reverser, it can be implemented with thrust reversers of different designs, particularly of the clamshell door type.

FIG. 1 shows a schematic part view of a nacelle incorporating a thrust reverser 1. The turbojet is not depicted. This thrust reverser 1 has a structure comprising two semicircular moving covers 2 capable of sliding in order to uncover cascades 3 of deflector vanes positioned between the moving covers 2 and a cross section for the passage of the air flow 4 that is to be deflected. Blocking doors 5 are positioned inside the structure so that they can pivot and move from a position in which they do not impede the passage of the flow of air 4 into a position in which they block off this passage. In order to coordinate the opening of the moving covers 2 with a shutting-off position of the blocking doors 5, the latter are mechanically connected to the moving cover 2 by hinges and to the fixed structure by a system of link rods (not depicted).

The movement of the moving covers 2 along the outside of the structure is performed by a collection of actuators 6a, 6b which are mounted on a front section inside which an electric motor 7 and flexible transmission shafts 8a, 8b connected to the actuators 6a, 6b, respectively, in order to actuate them, are housed.

The system for actuating the moving covers 2 is depicted by itself in FIG. 2. Each moving cover 2 can be translated under the action of three actuators 6a, 6b comprising a central actuator 6a and two additional actuators 6b, actuated by a single electric motor 7 connected to a control interface 9. The power delivered by the electric motor 7 is first of all distributed to the central actuators 6a via two flexible transmission shafts 8a and then to the additional actuators 6b by flexible transmission shafts 8b.

A diagram showing the steps of a method according to the invention for opening the thrust reverser 1 is given in FIG. 3.

First of all, the command 100 is given by the pilot to deploy the thrust reverser. This command is followed by a checking step 101 which will or will not authorize deployment according to the status of the control interface 9. If the response from a control interface 9 is negative, then this control interface aborts 102 deployment and a message 103 is sent via the control interface 9 to the instrument panel. It should be noted that certain aircraft manufacturers, for safety reasons, require that deployment or retraction be attempted even if the system does not authorize opening. In this case, the checking step 101 is omitted and replaced by one or more steps suited to this requirement.

A positive response from the control interface 9 initiates the onset of deployment 110.

First of all, the control interface 9 analyzes a parameter representative of the operating speed of the turbojet obtained from a FADEC (not depicted) with which the turbojet is equipped. This analysis step comprises a first substep 111, a second substep 112 and a third substep 113.

The first substep 111 consists in testing the availability of the representative parameter. If the value thereof cannot be obtained, then a default operating sequence is engaged. This default sequence may be the same as or different from an existing operating sequence used for defined values of the representative parameter. In this particular instance, this default sequence is identical to a sequence intended for heavily laden scenarios that will be described later on.

The second substep 112 and the third substep 113 use the value of the representative parameter. This value in the example will be expressed as a percentage of the maximum turbojet speed as given by the manufacturer. In this example, there are three operating sequences comprising a normal operating sequence 130 intended to be applied if the value of the representative parameter is less than N1% of the value corresponding to a maximum speed of the turbojet, an operating sequence for heavily laden scenarios 140 (aborted take-off or ATO in this example) intended to be applied if the value of the representative parameter is greater than or equal to N2, and an intermediate sequence 150 intended to be applied for values of the representative parameter that range between N1 and N2.

Each operating sequence 130, 140, 150 will now be described.

The normal operating sequence 130 comprises conventional steps aimed at unlatching the reverser, then at switching on the electric motor 7. This sequence comprises a regulating control loop aimed at keeping the torque delivered by the electric motor 7 at a value below Trq1. In addition, a control loop 131 monitors the rotational speed of the electric motor 7 and keeps it below 1750 revolutions per minute.

A test step 132 analyzes the travel covered by the moving covers 2. If this is greater than 35 mm after about 300 ms, opening continues, the motor torque remaining limited to Trq1, and a command 161 fixes the speed limit at 10740 revolutions per minute, which in this example is the maximum speed of the motor. If it is not, that is to say if the moving covers 2 have not covered more than 35 mm of translational movement in less than about 300 ms, that means that either the motor power is not enough to open the reverser in the total time given or that the motor is jammed. A command 162 then sets the maximum motor torque to a higher value Trq2. A test step 163 is then performed, the purpose of this being to determine whether the electric motor 7 is operating. If it is not operating, then a command 164 switches it to standby and a motor jammed message is sent in a step 165. If the electric motor 7 is operating, the step 161 increasing the speed of opening is applied and opening continues until it reaches its conclusion.

The operating sequence for heavily laden conditions 140 differs from the normal operating sequence 130 only in that the motor torque is limited to Trq2. It should be noted that this operating sequence 140 is also the default sequence applied when the value of the representative parameter is not available.

The intermediate operating sequence 150 differs from the operating sequence 130 only in that the motor torque is limited to a value Trqx determined by the application of a function similar to the value of the representative parameter. This similar function is defined such that, on the one hand, the value of Trqx for a representative parameter equal to N1 is Trq1, and, on the other hand, the value of Trqx for a representative parameter equal to N2 is Trq2.

As a safety measure, it is possible to ensure that the operating sequence for heavily loaded scenarios 140 comprises a checking step which sends a message to the instrument panel when, for example, more than three of the operating sequences for heavily laden scenarios 140 have been performed by default.

Figure 4:
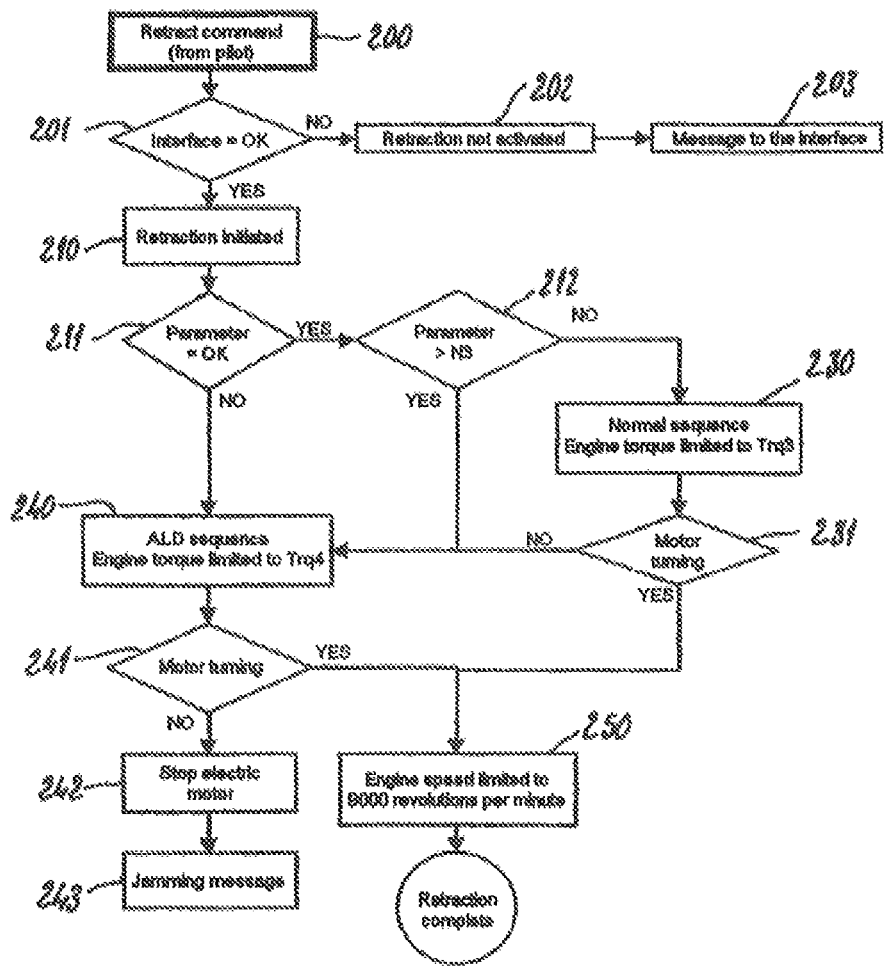
FIG. 4 is a diagram representing the steps of operation of a control method according to the invention for closing a thrust reverser.

Operating steps of a control method according to the invention for closing the thrust reverser 1 are depicted in FIG. 4.

First of all, the command 200 is given by the pilot to retract the reverser. This command is followed by a checking step 201 which will either authorize or not authorize retraction according to the status of the control interface 9. If the response from the control interface 9 is negative then it aborts 202 retraction and a message 203 is sent via the control interface 9 to the instrument panel.

A positive response from the control interface 9 initiates the onset of retraction 210.

First of all, the control interface 9 analyzes the parameter representative of the turbojet operating speed as obtained from the FADEC. This analysis step involves a first substep 211 and a second substep 212.

The first substep 211 consists in testing the availability of the representative parameter. If the value thereof cannot be obtained, then a default operating sequence is initiated. In this particular instance, this default sequence is identical to a sequence intended for heavily laden scenarios and which will be described later on.

The second substep 212 uses the value of the representative parameter to determine, from between a normal operating sequence 230 and a operating sequence for heavily laden scenarios 240, which sequence to apply.

The normal operating sequence 230 is applied if the value of the representative parameter is below a value N3 and involves the conventional steps aimed at switching on the electric motor 7 with a view to closing the reverser 1. This sequence comprises a control loop aimed at keeping the torque delivered by the electric motor 7 at a value below Trq3.

The operating sequence for heavily laden scenarios 240 is applied if the value of the representative parameter is greater than N3 and differs from the normal operating sequence 230 only in that the motor torque is limited to a value Trq4 higher than Trq3.

Furthermore, a test step 231 aimed at checking the operation of the electric motor 7 is provided at the start of the normal operating sequence 230. If the motor is not turning then the sequence intended for heavily laden scenarios 240 is applied. If the electric motor 7 is operating, its speed is increased by a command 250 but is nonetheless limited to the maximum speed of the electric motor 7, which in this example is 9000 revolutions per minute. The motor torque is still kept below or equal to Trq3. Retraction continues until it is complete.

The sequence intended for heavily laden scenarios 240 also comprises a test step 241 aimed at analyzing the operation of the electric motor 7. If the electric motor 7 is not operating, then a command 242 switches it to standby. This is because switching to standby is preferable to cutting off the power supply because the aerodynamic forces naturally tend to try to open the moving covers 2 so it is necessary to maintain a minimum standby torque. A command 243 then sends a message to the interface 9. If the electric motor 7 is operating, step 250 is applied and retraction continues until it is complete.

Figure 5:
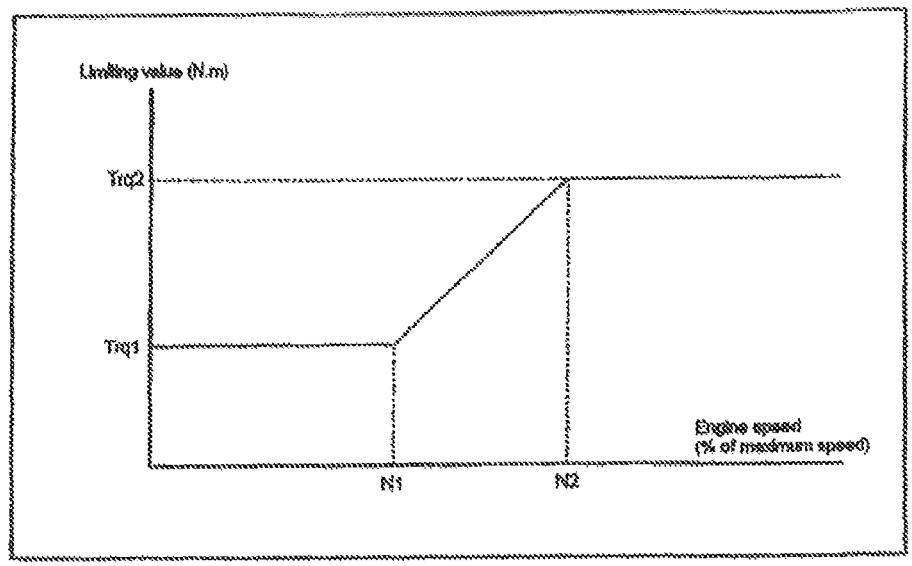
FIG. 5 is a curve representing the maximum limit torque allowed in the reverser opening phase as a function of turbojet speed.
Figure 6:
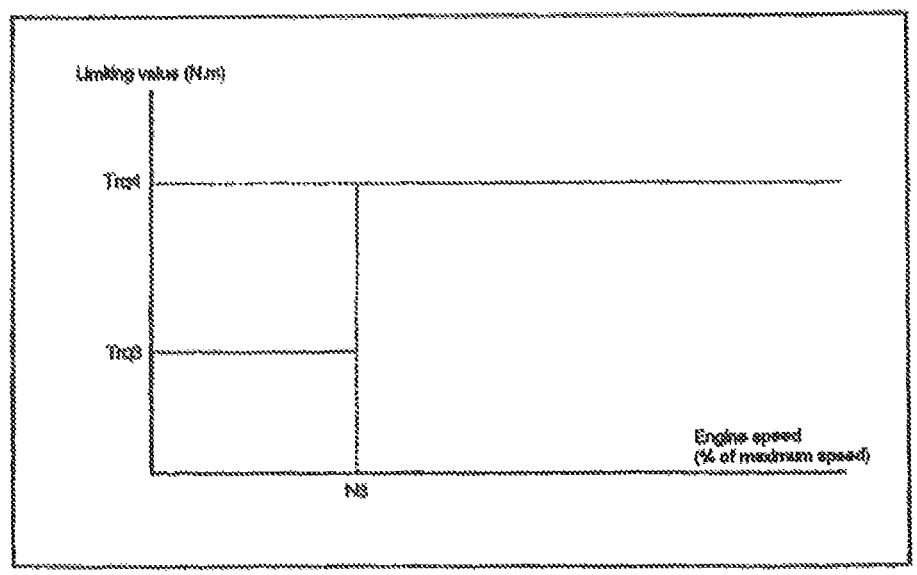
FIG. 6 is a curve representing the maximum limit torque allowed in the reverser closing phase as a function of turbojet speed.

FIGS. 5 and 6 show, for reverser 1 deployment and retraction respectively, examples of profiles of the maximum limiting torque values allowed as a function of the value of the representative parameter as come out of the methods described earlier and depicted in FIGS. 3 and 4. These profiles are intended to be programmed into the control interface 9 and are used to determine the appropriate operating sequence.

Figure 7:
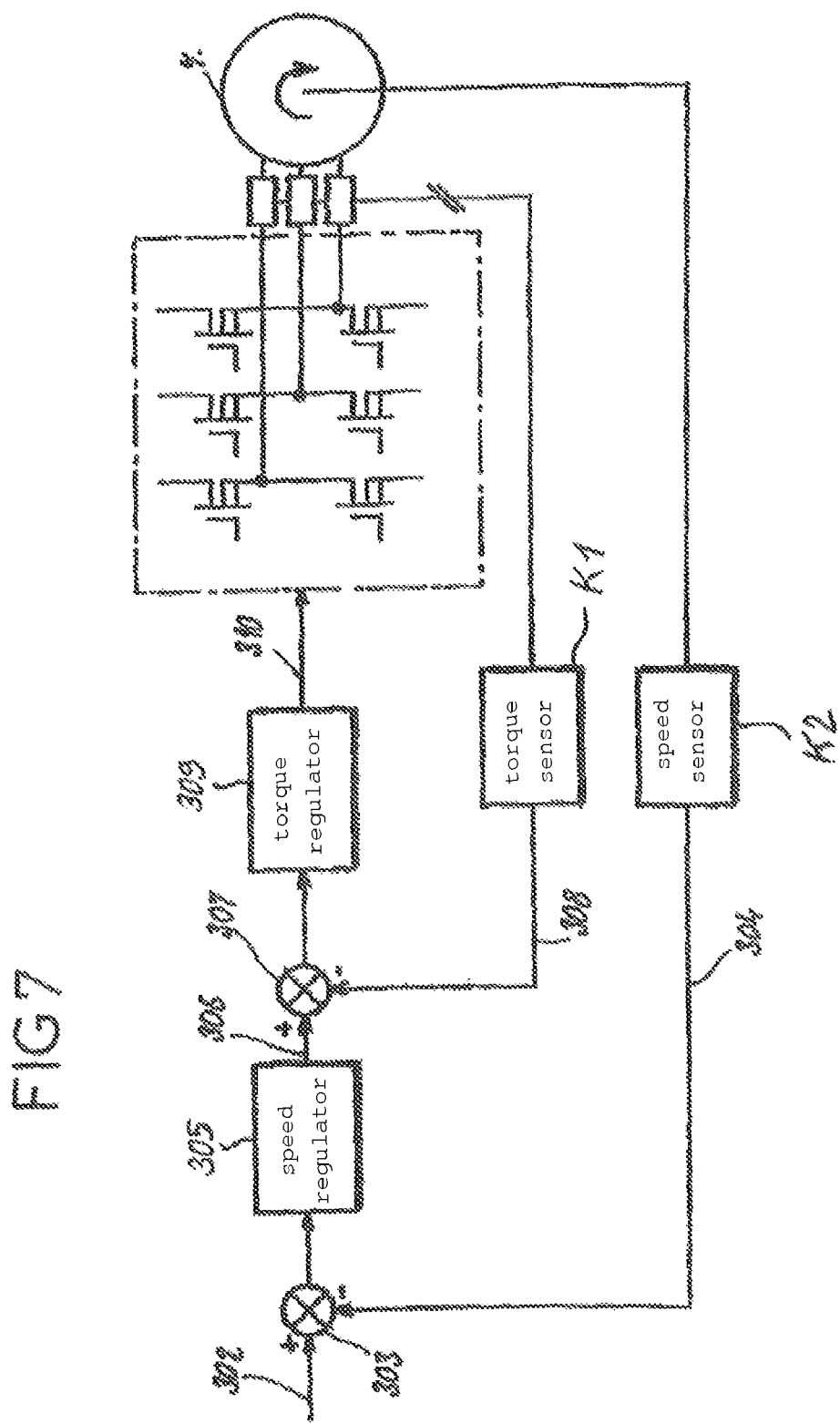
FIG. 7 is a simplified depiction of the design of a control interface with which a reverser according to the invention is equipped.

FIG. 7 depicts, in a simplified way, the operating diagram of the main circuits of a control interface 9 with which a thrust reverser 1 according to the invention is equipped. The control interface 9 operates the electric motor 7 which consists of a self-controlled synchronous motor capable of receiving torque or speed control commands.

An electric motor 7 such as this is particularly well suited to a method according to the invention. Its operation relies on the interaction between a magnetic rotor field and a rotary magnetic stator field. In an electric motor 7 such as this, a sensor detects the precise position of the rotor and allows a frequency converter to keep the angle between the rotor and the rotary stator field equal to 90° so that the motor torque is always at its maximum. Amplitude modulation of the rotary stator field fixes the value of the motor torque. The sensor also provides information regarding the rotational speed of the electric motor 7.

In operation, in order for the speed to remain constant if the load decreases or increases, the motor torque has to be decreased or increased. The amplitude of the rotary stator field will therefore be reduced or increased but the frequency of the field will be unchanged.

The interface receives a speed datum value 302 from which a comparator 303 subtracts the current speed 304 of the electric motor 7. The difference between these speeds is fed into a speed regulator 305 which calculates the appropriate response in the form of a torque datum value 306. This torque datum value 306 is fed through a comparator 307 which subtracts the current torque at 308 of the electric motor 7 from it. This difference is supplied to a torque regulator 309 which delivers the appropriate datum value 310 to the electric motor 7.

Although the invention has been described in conjunction with particular exemplary embodiments, it is obvious that it is not in any way restricted thereto and that it comprises all technical equivalents of the means described and combinations thereof where these fall within the scope of the invention.

The invention claimed is:

1. A control method for opening or closing a turbojet thrust reverser, employing at least one moving cover that can be moved by means of at least one electric motor, and the method comprising:
   measuring at least one parameter representative of the pressure in the turbojet stream,
   executing an active operating sequence selected from a set of active operating sequences in which at least one operating parameter of the electric motor is adjusted based on a value of the at least one parameter representative of the pressure.

2. The method as claimed in claim 1, wherein the representative parameter analyzed is obtained from a speed of a turbojet low pressure compressor shaft.

3. The method of claim 1, wherein the operating sequence executed is chosen from at least two predetermined sequences that correspond to instances in which the turbojet thrust reverser is operating at low speed and at high speed, respectively.

4. The method of claim 3, wherein the operating sequence executed for a turbojet operating at low speed comprises a test step for testing an operating status of the electric motor which, in the event that the latter is not operating, will cause an operating sequence intended for a turbojet operating at a higher speed to be applied.

5. The method of claim 1, wherein when the operating sequence is being executed, the electric motor delivers a torque less than or equal to a maximum limit value of the torque of the electric motor.

6. The method of claim 5, wherein when a value of the parameter representative of the turbojet speed lies within a predetermined range, the maximum limit value on the torque delivered by the electric motor is determined by applying a function of torque as a function of speed.

7. The method of claim 1, wherein at least at the start of the operating sequence, a speed of the electric motor is limited.

8. The method of claim 1, wherein the operating sequence executed comprises at least one step of checking and regulating a speed of the electric motor.

9. The method of claim 1, wherein the operating sequence comprises a control loop for checking an operating status of the electric motor and capable of shutting this electric motor down.

10. The method of claim 1, wherein provision is made for a default operating sequence to be initiated if the representative parameter cannot be analyzed.

11. A thrust reverser comprising at least one moving cover that can be moved under the action of at least one electric motor, wherein the electric motor is controlled via at least one control interface capable, in succession, of measuring at least one parameter representative of a pressure in a turbojet stream, and executing an active operating sequence selected from a set of active operating sequences in which at least one operating parameter of the electric motor is adjusted based on a value of the at least one parameter representative of the pressure.

12. The reverser of claim 11, wherein the electric motor is a self-controlled synchronous motor.

13. The reverser of claim 11, wherein the electric motor is torque controlled at constant speed.

14. The reverser of claim 13, wherein the at least one control interface comprises regulating means for regulating the torque delivered by the electric motor.

15. The reverser of claim 13, wherein the at least one control interface is capable of receiving a speed datum value and of converting it into a torque instruction that it delivers to the electric motor.

16. The reverser of claim 15, wherein the at least one control interface comprises regulating means for regulating a speed of the electric motor.

* * * * *